(12) United States Patent
Choudhary

(10) Patent No.: US 11,311,135 B2
(45) Date of Patent: Apr. 26, 2022

(54) IMAGE PROCESSING BY DETERMINING COMBINED IMAGE DISTANCES USING DUAL PATH ANALYSES

(71) Applicant: Prashant Choudhary, Milpitas, CA (US)

(72) Inventor: Prashant Choudhary, Milpitas, CA (US)

(*) Notice: Subject to any disclaimer, the term of this patent is extended or adjusted under 35 U.S.C. 154(b) by 209 days.

(21) Appl. No.: 16/671,514

(22) Filed: Nov. 1, 2019

(65) Prior Publication Data

US 2020/0138228 A1 May 7, 2020

Related U.S. Application Data

(63) Continuation of application No. 15/083,140, filed on Mar. 28, 2016, now Pat. No. 10,555,633.

(60) Provisional application No. 62/138,985, filed on Mar. 27, 2015.

(51) Int. Cl.
*A47J 27/00* (2006.01)
*A23L 5/10* (2016.01)
*A47J 36/32* (2006.01)
*G06N 20/00* (2019.01)

(52) U.S. Cl.
CPC ............... *A47J 27/004* (2013.01); *A23L 5/10* (2016.08); *A47J 36/32* (2013.01); *A47J 36/321* (2018.08); *G06N 20/00* (2019.01)

(58) Field of Classification Search
CPC ... A23L 5/00; A23L 5/10; A47J 27/004; A47J 36/32; A47J 36/321; G06N 20/00

USPC .......................................................... 99/333
See application file for complete search history.

(56) References Cited

U.S. PATENT DOCUMENTS

| 2011/0117259 | A1 | 5/2011 | Storek |
| 2011/0253693 | A1 | 10/2011 | Lyons et al. |
| 2013/0101714 | A1 | 4/2013 | Buehler |
| 2013/0149679 | A1* | 6/2013 | Tokuda ............... G09B 19/0092 434/127 |
| 2013/0302483 | A1* | 11/2013 | Riefenstein ............. G06T 7/001 426/233 |
| 2014/0170275 | A1 | 6/2014 | Bordin et al. |

FOREIGN PATENT DOCUMENTS

WO 2014/086487 6/2014

* cited by examiner

*Primary Examiner* — Dana Ross
*Assistant Examiner* — Joseph W Iskra
(74) *Attorney, Agent, or Firm* — Law Office of Dorian Cartwright; Dorian Cartwright

(57) ABSTRACT

Image analysis for comparison utilizes a combined image distance determined between the one or more captured images and the one or more reference images from a dual path analysis. The dual path analysis can comprise a first image analysis based on histograms of image colors and a second image analysis based a one-dimensional power spectral density of a black and white instance of the one or more captured images and the one or more reference images. In one case, the one-dimensional power spectral density derived by integrating a Discrete Fourier Transform of a two-dimensional image over annular rings of substantially equal area starting from the center of the two-dimensional image.

6 Claims, 16 Drawing Sheets

1200 ⤴

| Ingredient | Quantity | Units | Bin |
|---|---|---|---|
| Water | 500 | mL | Water Dispenser |
| Tea Leaves | 500 | mL | 1 |
| Cardomom | 2 | | 2 |
| Ginger Crushed | 1 | tsp | 2 |
| Sugar | 3 | tsp | 2 |
| Milk | 500 | mL | 3 |

1210　1212　1214　1216　1218

| Time | User Action | Visual Image Sensor | Thermal Image Sensor | Weight Sensor | Temperature Sensor | |
|---|---|---|---|---|---|---|
| Seconds | Code | Data | Data | Grams | Fahrenheit | |
| 0 | A1 | vimage Data0 | timage Data0 | Wt_0 | Temp_0 | |
| 1 | | vimage Data1 | timage Data1 | Wt_1 | Temp_1 | |
| 2 | | vimage Data2 | timage Data2 | Wt_2 | Temp_2 | Phase 1 |
| 3 | | vimage Data3 | timage Data3 | Wt_3 | Temp_3 | |
| ... | ... | ... | ... | ... | ... | |
| 224 | | vimage Data224 | timage Data224 | Wt_224 | Temp_224 | 1202 |
| 225 | | vimage Data225 | timage Data225 | Wt_225 | Temp_225 | |
| 226 | A7 | vimage Data226 | timage Data226 | Wt_226 | Temp_226 | |
| 227 | | vimage Data227 | timage Data227 | Wt_227 | Temp_227 | Phase 2 |
| 228 | | vimage Data228 | timage Data228 | Wt_228 | Temp_228 | |
| ... | ... | ... | ... | ... | ... | |
| 632 | | vimage Data632 | timage Data632 | Wt_632 | Temp_632 | 1204 |
| 633 | | vimage Data633 | timage Data633 | Wt_633 | Temp_633 | |
| 634 | A52 | vimage Data634 | timage Data634 | Wt_634 | Temp_634 | |
| 635 | | vimage Data635 | timage Data635 | Wt_635 | Temp_635 | Phase 3 |
| ... | ... | ... | ... | ... | ... | |
| 1211 | | vimage Data1211 | timage Data1211 | Wt_1211 | Temp_1211 | 1206 |
| 1212 | | vimage Data1212 | timage Data1212 | Wt_1212 | Temp_1212 | |
| 1213 | A29 | vimage Data1212 | timage Data1213 | Wt_1213 | Temp_1213 | |
| 1214 | | vimage Data1212 | timage Data1214 | Wt_1214 | Temp_1214 | |
| 1215 | | vimage Data1212 | timage Data1215 | Wt_1215 | Temp_1215 | |
| 1216 | | vimage Data1212 | timage Data1216 | Wt_1216 | Temp_1216 | Phase 4 |
| ... | ... | ... | ... | ... | ... | |
| 3235 | | vimage Data3235 | timage Data3235 | Wt_3235 | Temp_3235 | |
| 3236 | | vimage Data3236 | timage Data3236 | Wt_3236 | Temp_3236 | |
| 3237 | | vimage Data3237 | timage Data3237 | Wt_3237 | Temp_3237 | |
| 3238 | | vimage Data3238 | timage Data3238 | Wt_3238 | Temp_3238 | 1208 |
| 3239 | End | vimage Data3239 | timage Data3239 | Wt_3239 | Temp_3239 | |

FIG. 12

IMAGE PROCESSING BY DETERMINING COMBINED IMAGE DISTANCES USING DUAL PATH ANALYSES

CROSS-REFERENCE TO RELATED APPLICATIONS

This application is a continuation of U.S. application Ser. No. 15/083,140, filed on Mar. 28, 2016 by Prashant Choudhary and entitled Autonomous Cooking Device to Prepare Food from a Recipe File and Method of Creating Recipe Files, which in turn claims priority to, U.S. Application No. 62/138,985, filed on Mar. 27, 2015 by Prashant Choudhary, et al. and entitled Autonomous Cooking Device to Prepare Food from a Recipe File and Method for Creating Recipe Files, the content of both being incorporated herein by reference in their entirety.

FIELD OF THE DISCLOSURE

The invention relates generally to autonomous cooking devices, and more specifically, to image processing by determining combined image distances using dual path analyses.

BACKGROUND OF DISCLOSURE

Recipes are a general ideal set of cooking instructions for manual food preparation. Some recipes are written down on index cards for personal reference, or published in a cook book or even online for sharing. Even with the instructions, a novice cook can find it difficult, or at least tedious, to replicate the cooking process of a professional cook. It can also be difficult to consistently recreate personal recipes.

Existing cooking devices have only a basic level of automation. For example, a microwave oven cooks according to a programmed time at a programmed power level. A coffee machine can automatically brew a pot of coffee at a programmed time using water and coffee beans. However, none of these machines are able to operate in an intelligent manner. For example, these machines are unable to adapt to actual conditions during preparation. In another example, none of these machines are able to learn new recipes.

It is desirable to overcome these shortcomings. Therefore, what is needed is a robust autonomous cooking device to automatically prepare food. The device should use computer vision and machine learning to learn new recipes, and the device should adapt to sensor feedback in real-time during preparation. Furthermore, the device should be networked for retrieving and sharing or selling recipe files within an online community.

SUMMARY OF THE DISCLOSURE

To meet the above-described needs, image processing is performed by determining combined image distances using dual path analyses.

In one embodiment, an image sensor captures one or more images of a subject for comparison against one or more reference images. A control unit comprising an image analyses module to compare one or more captured images against one or more reference images stored in the storage device.

In another embodiment, a combined image distance is determined between the one or more captured images and the one or more reference images from a dual path analysis. The dual path analysis can comprise a first image analysis based on histograms of image colors and a second image analysis based a one-dimensional power spectral density of a black and white instance of the one or more captured images and the one or more reference images. In one case, the one-dimensional power spectral density derived by integrating a Discrete Fourier Transform of a two-dimensional image over annular rings of substantially equal area starting from the center of the two-dimensional image.

In still another embodiment, the image analysis module computes the combined image distance measure by combining an image distance measure generated from the color histograms data with an image distance measure generated from the one dimensional power spectral density comparison, and in one case applies adjustable weights for each of the first and second paths. Next, the control unit takes an action to affect external to the image processing unit based on the combined image distance from the image comparison.

Advantageously, image analysis for comparison is more accurate.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 12 is a diagram of a table illustrating a recipe file, according to one embodiment.

DETAILED DESCRIPTION OF THE DISCLOSURE

Autonomous cooking devices, and methods operating therein, are described. At a high-level, the device can automatically determine optimum cooking time (i.e., remaining cooking time) for different phase of cooking for various types of food cuisines such as American, Indian, Chinese, or others. Cooking tasks include boiling eggs, brewing tea or coffee, making yogurt, preparing curries and the like. The design is intuitive and optimized for mass production. Aspects of intelligence are easily trainable and components require minimal cleaning. A compact form factor helps for easy storage and deployment.

Many other aspects of the system are possible within the spirit of the present invention, as will be apparent to one of ordinary skill in the art. The techniques can be implemented in any suitable computer system having network access using a combination of computer software and/or computer hardware. Accordingly, the following details are non-limiting and are set for only for the purpose of illustration of preferred embodiments which can be varied within the spirit of the current invention by those of ordinary skill in the art.

I. Components of the Cooking Device

Figure 1:
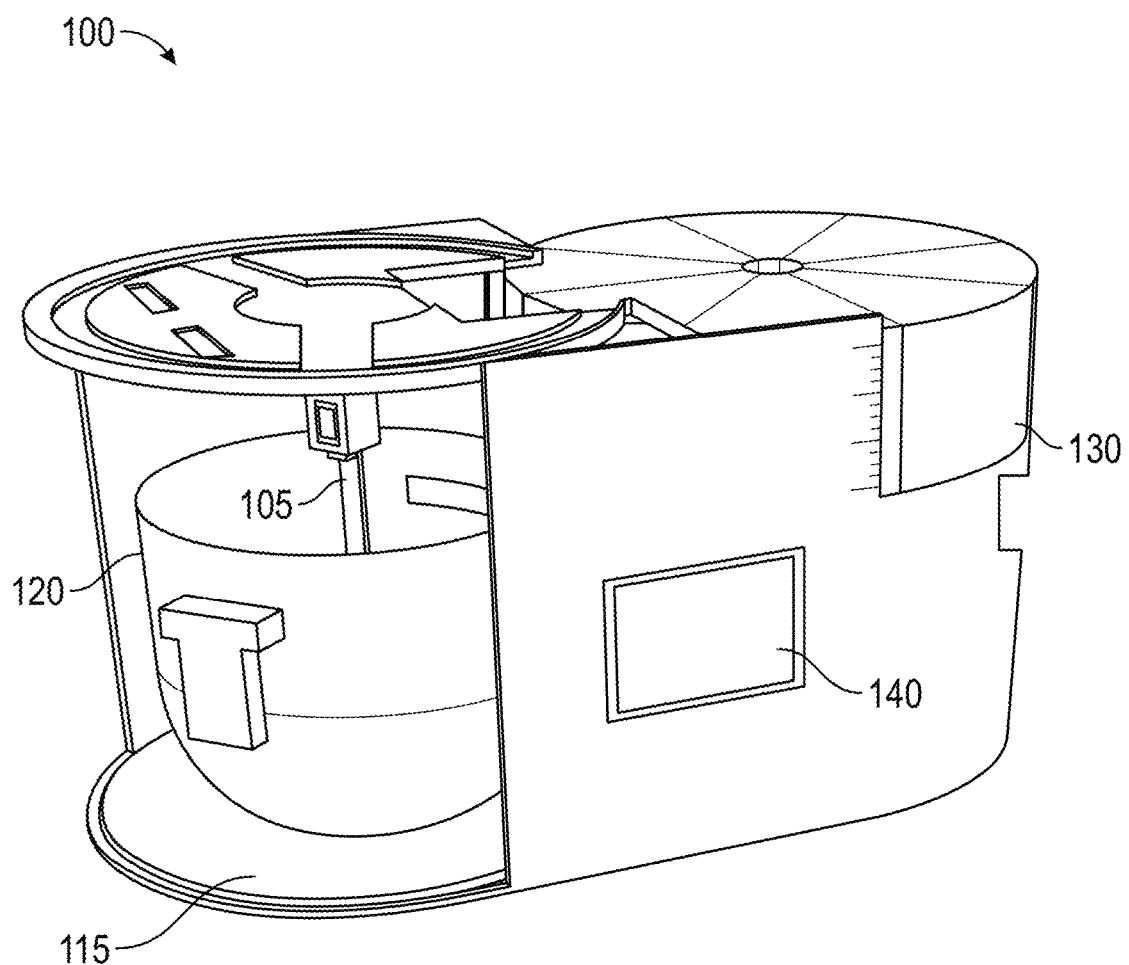
FIG. 1 is a perspective view illustrating an autonomous cooking device utilizing recipe files, according to one embodiment.

FIG. 1 is a perspective view of an autonomous cooking device 100, according to one embodiment. The cooking device 100 generally includes an outer shell 110, a cooking unit 120, an ingredient container 130, and a control unit 140.

A. Outer Shell

The outer shell 110 covers the internal components which are affixed to a base. In FIG. 1, a door is opened or a panel is removed for access to the internal components, including the cooking unit 120 and a mixing blade shaft 105 and rotating platform 115 with a heating element. A lid 125 rests on top of side walls of the outer shell 110 and an ingredients container 130 is also integrated with the shell. The specific configuration of FIG. 1 is merely one example of numerous possible variations.

The digital camera is one type of cooking sensor that provides feedback during the cooking process. A camera hole 125 can be bored in a lid 200 of the outer shell 110 in one embodiment, or on the side or other appropriate location in other embodiments. The outer shell 110 can be made of an opaque material which can block ambient lighting in order to protect the integrity of internal images captured by the digital camera during cooking. Some embodiments of the digital camera have auto-focus and calibration capabilities. An LED light provides a constant flicker-less source of light for capturing images. Captured images can be passed to an image processing unit as input to adaptations made on the fly. The captured images can also show levels of or identify ingredients. An air nozzle 135 or other device self-cleans a camera lens, for example, to remove food debris, steam or condensation.

In one embodiment, a thermal imaging camera is also used to sense how well the ingredients are cooked from inside which might not be obvious from visual images in certain situations. For example, an algorithm using color histograms and power spectral densities can determine a difference between cooking food image and reference photos of fully cooked food (or of individual cooking phases for a cooked dish). Additional sensors that can be optionally connected to the outer shell 110 are described below.

The exhaust fan can also be attached to a lid to remove smoke and vapors from inside of the device. A filter can be periodically cleaned.

A touch screen user interface or other display device on the outer shell shows information and receives user input. Examples of displayed information and input mechanisms include ingredient levels and status, temperature readings and settings, cooking progress, video camera output, user instructions, recipe information, start and stop buttons, control knobs, time and the like. Input/output interface such a USB can also be included on the outer shell.

Other computer circuitry such as the processor and software can be deployed in the outer shell along with shielding for protection from the heat, fumes, moisture and other dangers to electronics.

B. Ingredient Container

The ingredients container 130 holds meal ingredients such as water, milk, flour, eggs, meat, vegetables, cooking oil, herbs, and seasonings. There are several equal-sized containers (e.g., 2 to 10 containers), or varying sized containers formed by splitting a standard container into sub-containers. The containers can be different shapes A total volume of the dispensers is preferably greater than the volume of the cooking unit. The containers are easily removed for loading, cleaning, and to be manipulated by the cooking device. Containers can be removed individually or the whole container unit can be removed for easy cleaning. A shutter can cover the containers in order to preserve and protect ingredients from cooking fumes and smoke. In some embodiments, disposable containers (e.g., available in a grocery store or by mail) can be used. In other embodiment, a cooling element refrigerates one or more of the containers.

As directed by the control unit 140, the ingredients container 130 can use electrical and mechanical components to autonomously add contents to the cooking unit 120 at a particular time. A weight sensor or volume sensor can manage adding, for example, half a container of flour at a first time and the other half of the container at a second time.

The ingredients container 130 shown in FIG. 1 is disposed near the cooking unit 120. A container 410 rests on a container base 405 which connects to a container platform 420. A motor 425 turns a bearing 430 connected to the container platform 420. A solenoid 440 pulls down a spring-loaded ferrous container lock 450 to release container base 405. The controller unit 140, having knowledge of which ingredients are in which containers, can rotate the ingredients container 130 similar to a carousel until the appropriate container reaches a position for dispensing. A solenoid 440 pulls container lock down.

In one embodiment, a water supply is connected for dispensing into the cooking process. In another embodiment a water dispenser is integrated with the device.

C. Cooking Unit

Figure 2:
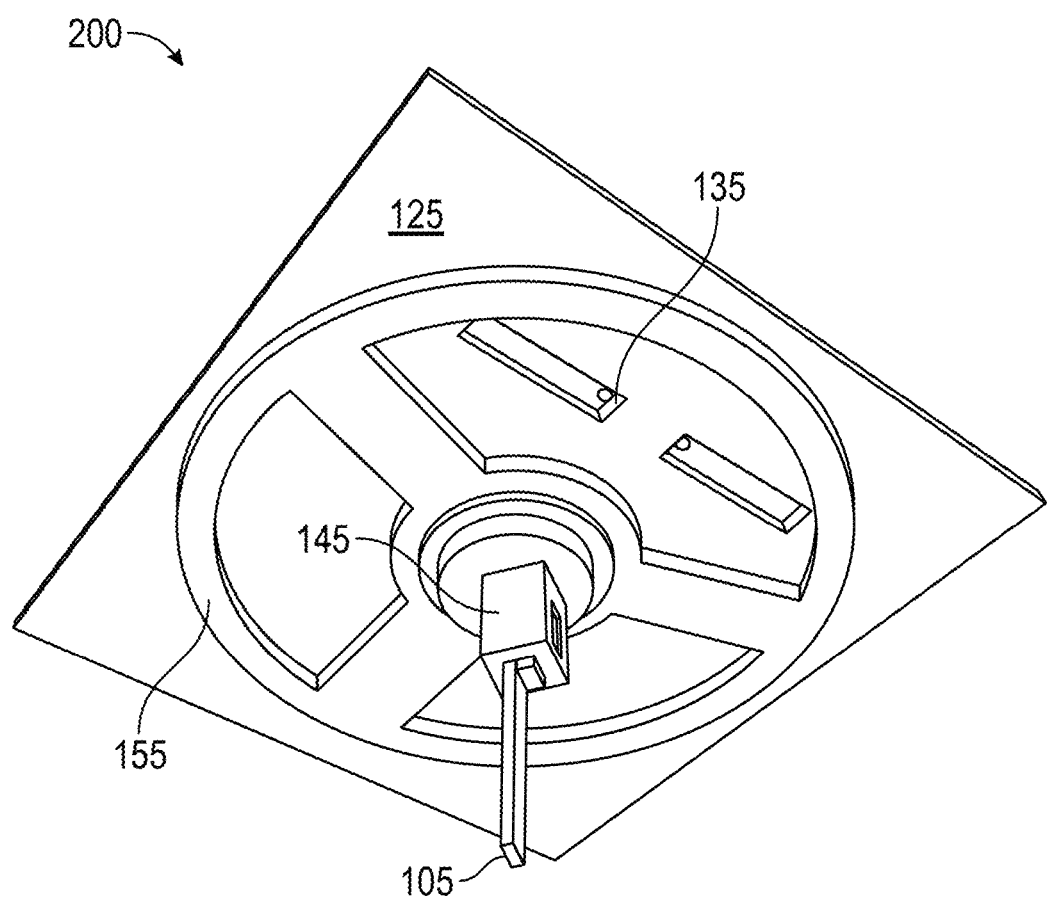
FIG. 2 is a bottom perspective view illustrating a mixing blade assembly of the autonomous cooking device of FIG. 1, according to one embodiment.
Figure 5:
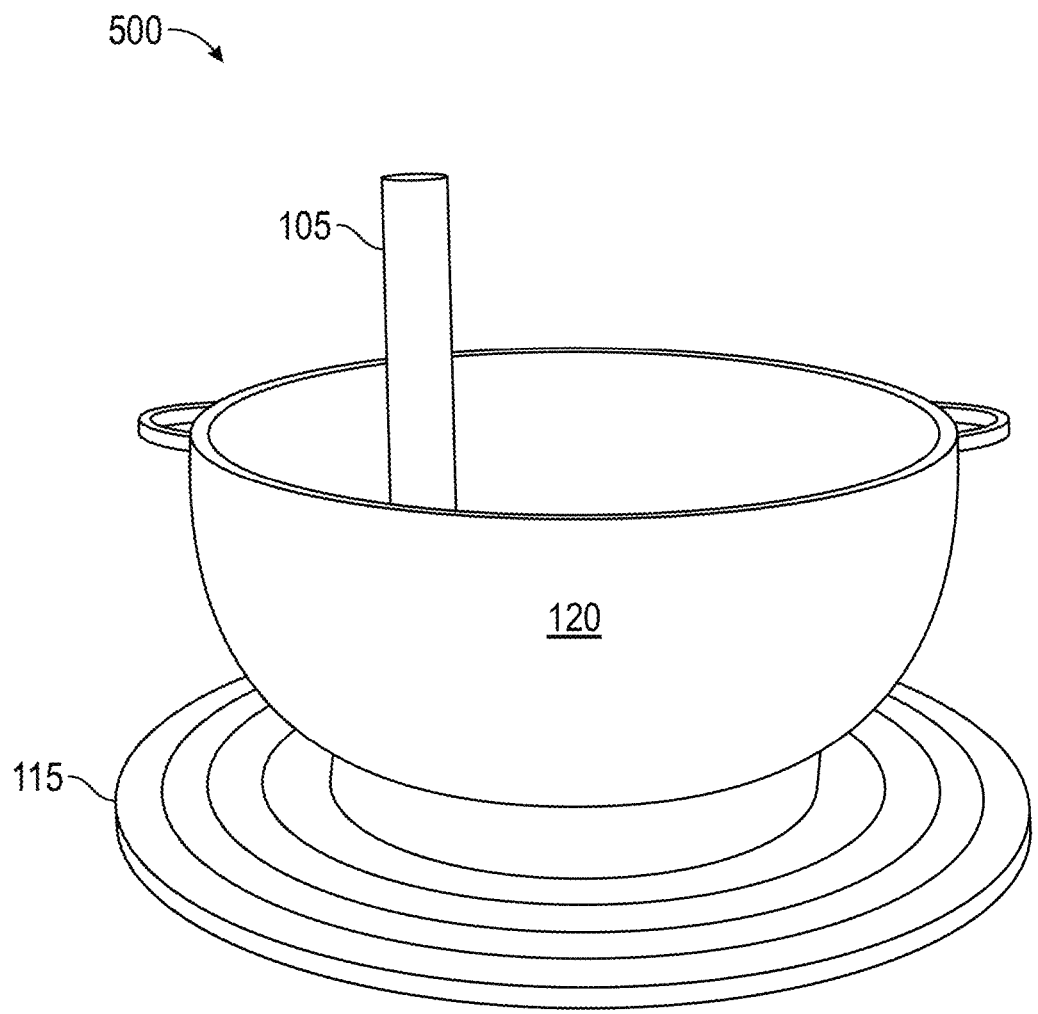
FIG. 5 is a perspective view illustrating a cooking unit with three degrees of freedom for mixing in the autonomous cooking device of FIG. 1, according to one embodiment.

A detail of the cooking unit 120 with the mixing blade 105 and the rotating platform 115 is shown in FIG. 5. An underside of the lid 125 with a connection to the mixing blade shaft 105 is shown in FIG. 2. A mixing blade mount 145 affixes the mixing blade shaft 105 to a mixing wheel 155. Other components of the cooking unit 120 (not shown in pictures) include a heating element and an optional cooling unit. The heating element could be an inductive coil, a resistive heating coil or any other means.

Figure 3:
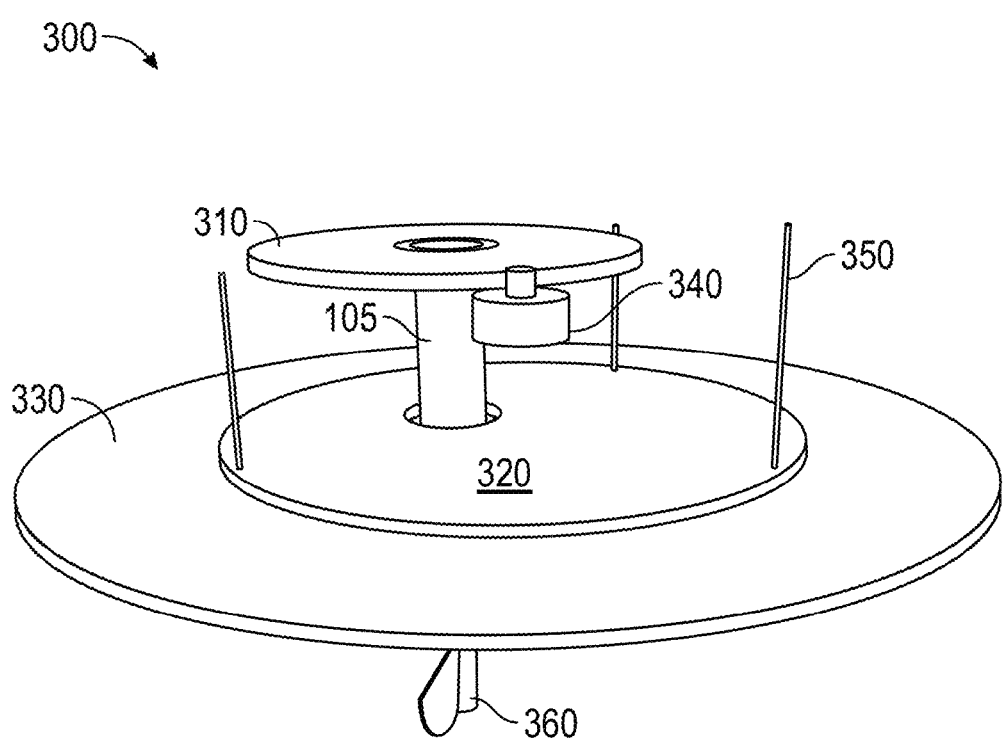
FIG. 3 is a perspective view illustrating a lid assembly of the autonomous cooking device of FIG. 1, according to one embodiment.
Figure 4:
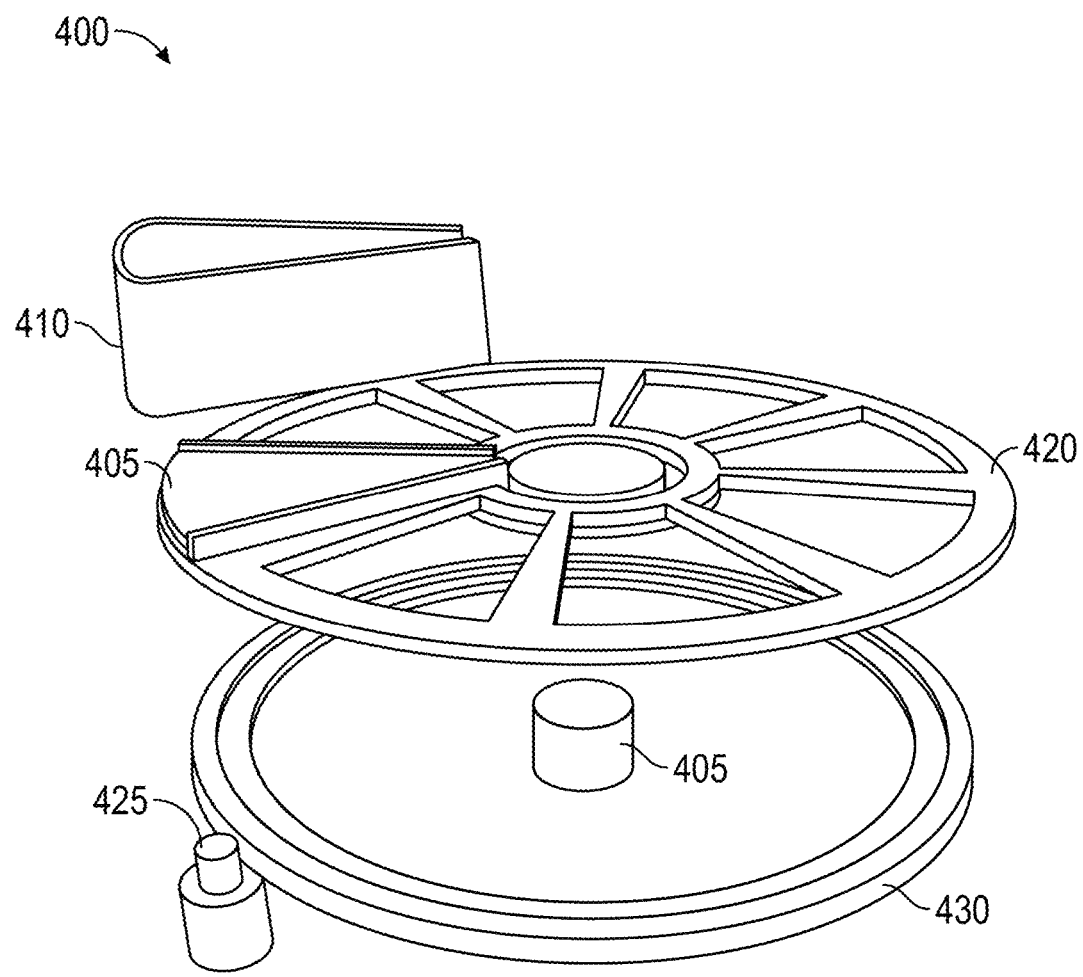
FIG. 4 is an exploded view illustrating an ingredient dispensing platform of the autonomous cooking device of FIG. 1, according to one embodiment.

As shown in FIG. 3, a removable cooking lid 330 is attached to a heavy lid holder base 320 which can be moved up or down using three steel cables 350. A cooking lid slides over the mixing blade shaft 105. A mixing blade motor 340 turns a mixing blade rotator 310 connected to the mixing blade shaft 105 which turns a spring-loaded mixing blade 360, in the current embodiment.

The mixing blade 360 can be a general-purpose mixing blade that works across different phases of cooking (e.g., similar blade to Kitchen-Aid stand mixer). The mixing blade 360 is strong enough to mix viscous cookie dough as well as delicate ones. The mixing blade 360 is removable for cleaning or switching out different sizes. In some embodiments, more than one mixing blade is provided. A stepper motor or DC servo motor 340 drives the mixing blade 360 using electric power to spin a mixing blade rotator 310.

In one embodiment, the mixing blade 360 can also move vertically up or down to allow for mashing of ingredients. The cooking unit 120 can be independently rotated in addition to rotation and up and down traversal of the mixing blade 360 to give more degrees of freedom in mixing compared to a stand-mixer mechanism. Using camera feedback or other sensors, the motor can rotate the main cooking utensil to necessary positions. A dual motor mixing mechanism can rotate the blades and the cooking platform. The mixing blade shaft 105 is mounted to the lid 125 in FIG. 1 but can alternatively be attached to a base. A paddle or scooper serves as the main cooking utensil in this embodiment. Parts can be interchangeable in order to substitute the mixing blade with a mixer or other tool. Additional variations are possible.

In one embodiment, a cooling unit refrigerates dishes after preparation. The cooling unit can be combined with or independent of ingredient refrigeration. The cooling unit can also reduce temperatures for various phases of cooking.

D. Control Unit

Figure 6:
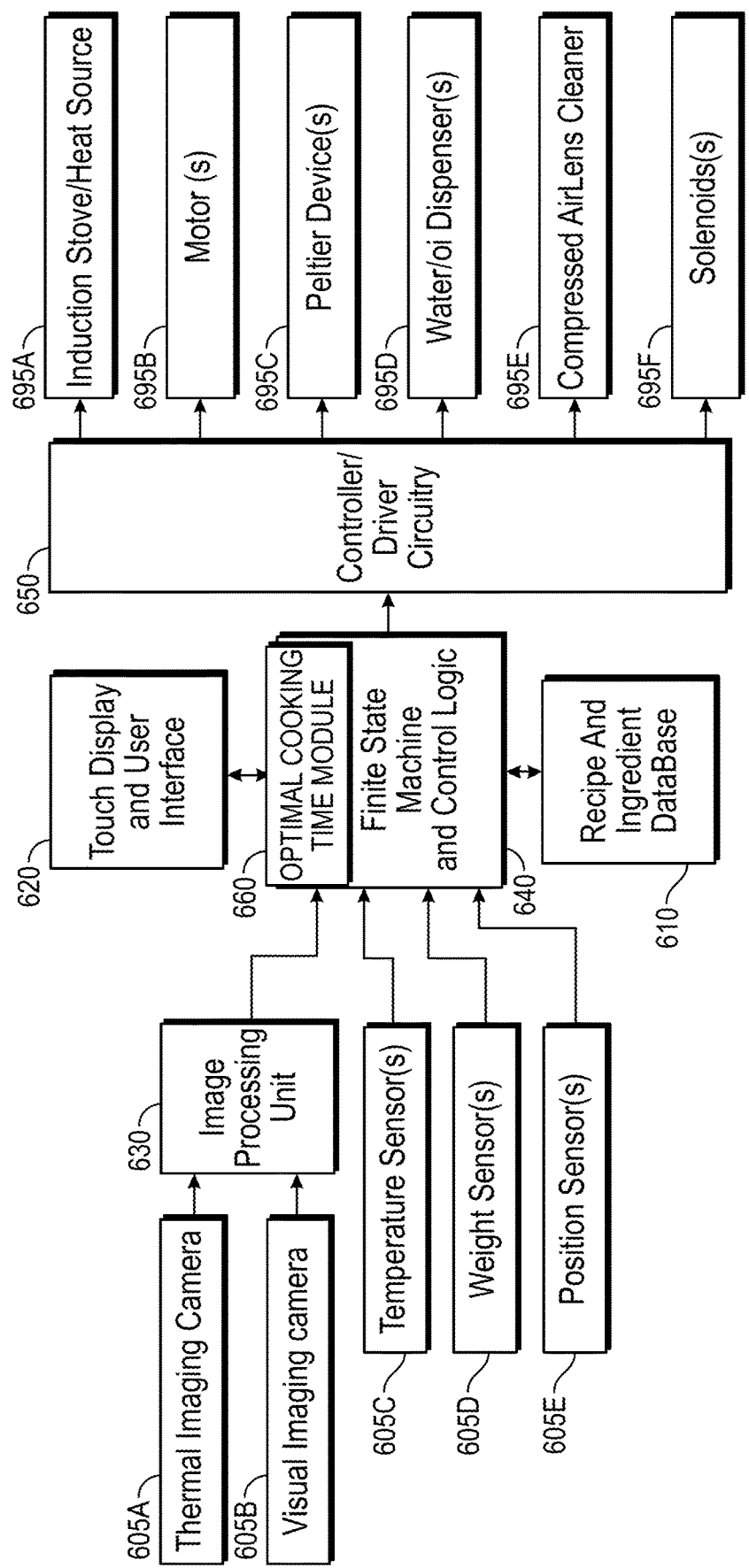
FIG. 6 is a block diagram of a finite state machine for electronics of the autonomous cooking device, according to one embodiment.

The control unit 140 includes and cooperates with several components as the brains of the cooking device 110, an example of which is shown in the block diagram of FIG. 6. Generally, a processor, a memory, an input/output device, and various electronic sensors automate food preparation. The control unit 140 can be isolated from the harsh cooking environment in order to protect sensitive electronics by using insulation, shields, or the outer shell 110. Based on input from sensors 605A-695E, a finite state machine and control logic 640 determines outputs for controller/driver circuitry 650 in adjusting components 695A-695F.

A touch display and user interface 620 can receive instructions by a user performing manual steps during a training phase. For example, while training for preparation of brownies, contents of the ingredient containers 130 can be found in a local or networked database (e.g., recipe and ingredient database 610) and associated with the recipe file for brownies. Besides preparation instructions, some embodiments also save nutritional information and images to the recipe file. The input/output device can also display real-time information from sensors (e.g., temperature, predicted finish time, and other data).

Sensors 605A-605E provide real-time feedback about current conditions of the food being prepared. This allows for sensor levels to be recorded during training, and to make sure the food being prepared according to a recipe file is cooking as expected. For example, a temperature sensor 605C measures a temperature of meat being cooked or soup being prepared. In another example, the thermal imaging camera 605A can be used to ensure food is perfectly cooked and not under-cooked or over-cooked, using infrared technology. In yet another example, a video camera coupled to video recognition capabilities as another form of monitoring. The video camera can also stream to a remote online resource for processing. In still another example, one or more weight sensors 605D aids administration of ingredients as well as serving to monitor cooking (e.g., monitoring change in weight as an indication of cooking progress). A position sensor 605E and many other types of sensors are possible. The user interface can be used to view sensor parameters, and for manual input or updates to sensor data.

In more detail, a visual imaging camera 605B is one type of cooking sensor that provides feedback during the cooking process. The visual imaging camera 605B can be attached to a lid of the outer shell 110 in one embodiment, or on the side or other appropriate location in other embodiments. The outer shell 110 can be made of an opaque material which can block ambient lighting in order to protect the integrity of internal images captured by the digital camera 605A during cooking. Some embodiments of the digital camera have auto-focus and calibration capabilities. An LED light provides a constant flicker-less source of light for capturing images. Captured images can be passed to an image processing unit as input to calculate remaining cooking time by comparing current images of food to reference images, as described further below with respect to FIG. 11. The captured images can also show levels of or identify ingredients. An air nozzle or other device self-cleans a camera lens, for example, to remove food debris, steam or condensation.

A recipe file 1200 is shown in the table of FIG. 12. The table shows sensor data from a camera, a thermometer, and a scale. Reference images can be stored within the recipe file 1200, in memory, or online. Real-time data can be plotted on the table to identify a corresponding time. In some cases, such as depending on a type of dish being prepared, the camera data is weighted more than the scale data, when plotting to a particular row on the table. Many implementation-specific algorithms are possible. Ingredients along with amounts are also described in the recipe file 1200. Instructions can be grouped by the different cooking phases I-IV 1202, 1204, 1206, 1208 because settings may need automatic adjustment in between phases. Rows of sensor data are shown for vimageData or visual image sensor data 1212, timageData or thermal image sensor data 1214, Wt_ or weight sensor data 1216 and Temp_ or temperature sensor data 1218. In other embodiments, commands and computer instructions are also included in the receipt file 1200.

The central processing unit can comprise a standard PC processor, a mobile processor, or a specialized processor or ASIC. In one embodiment, a connected mobile device or online server performs processing used in the cooking process. An image processing unit 630 implemented in hardware and/or software is available to the finite state machine and control logic 640 captures and processes data from multiple sensors and creates a recipe file. During autonomous cooking process, the data in the recipe file is used as a reference to compare with current sensor data and decide optimal cooking time to get same results as during training process. An optimal cooking time module 660 determines how much cooking time remains using output from the image processing unit 630 which determines a difference between real-time and reference images. Additional data inputs can optionally take into consideration the other sensor data versus the other reference sensor data concerning weight, temperature, and the like. The remaining cooking time can be in reference to individual phases, or in reference to the dish as a whole. Advantageously, individual cooking phases can be automatically detected and additional ingredients added, or cooking temperature be changed as examples automated responsive actions using components 695A-695F.

The memory device can store multiple recipe files and source code executable during operation of the cooking device 110, as described herein.

E. Network Interface

Figure 7:
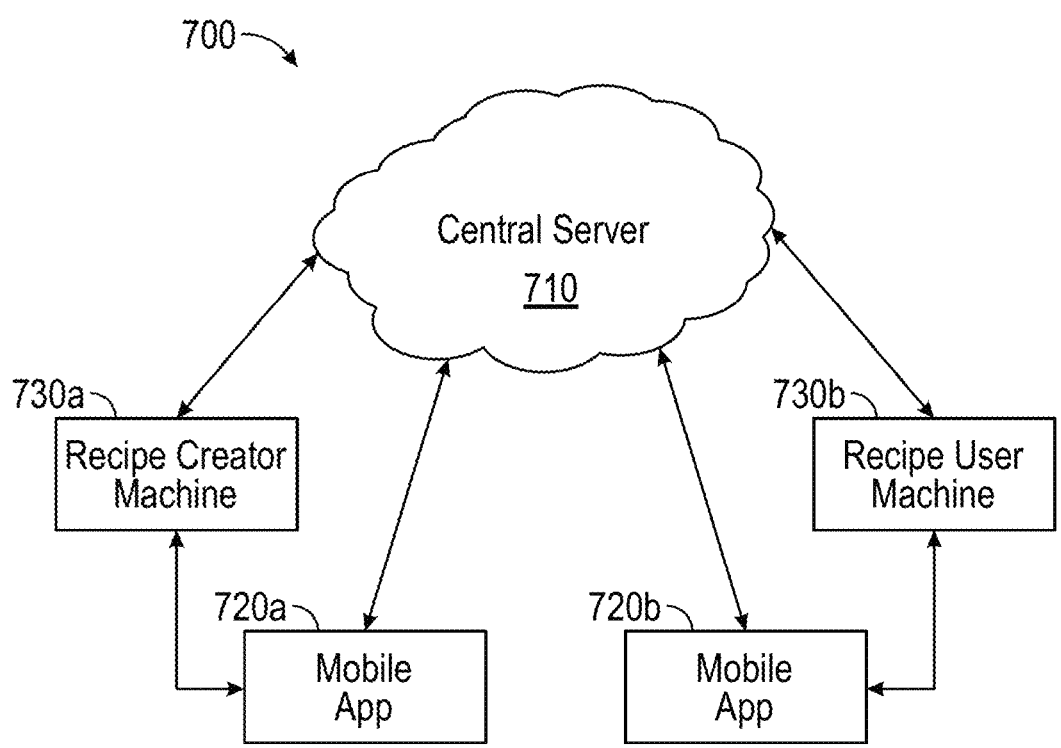
FIG. 7 is a network architecture including the autonomous cooking device for sharing recipe files, according to one embodiment.

External resources can be accessed by the cooking device as shown in the example of FIG. 7. A network interface such as a MAC card, IEEE 802.11 interface, or cellular network interface connects the cooking device to a central server 710, search engines, and other external resources. A mobile app 720A, 720B can be used as a proxy for network communications and then connected in communication with the cooking device for data transfer.

In one embodiment, a user generates recipe files at a recipe creator machine 730A which can be the cooking device 100 or some other device such as a personal computer or smart phone. Manual steps can be actual steps that are recorded while preparing a food dish, or can be instructional steps that are entered to a tablet computer, in order to generate recipe files. The uploaded recipe file can be stored privately at a user profile (e.g., Dropbox account), shared privately, sold to the public, or the like. Other users, or the same user at a different cooking device can download recipe files to a recipe user machine 730B.

In another embodiment, food preparation can be controlled remotely through network connections and local cameras and other sensors. The central server 710 or a user can get remote feedback and send commands in response, to affect food preparation.

III. Methods of Operation in the Cooking Device

Figure 8:
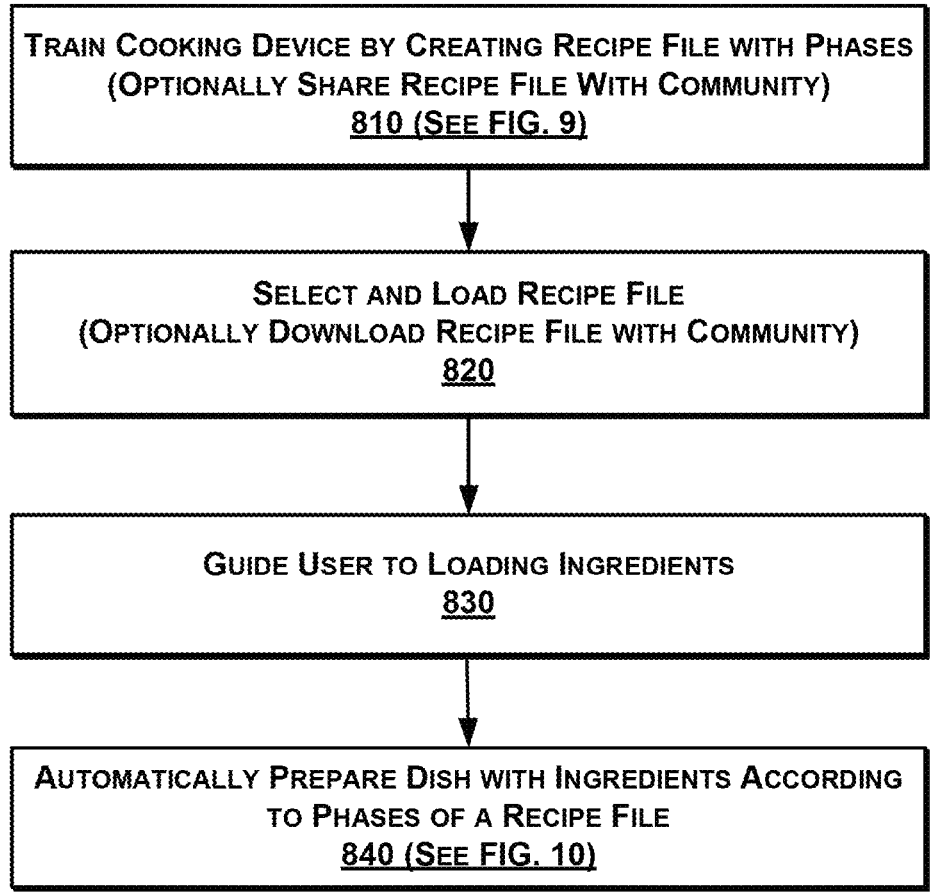
FIG. 8 is a flow diagram illustrating a method for food preparation in the autonomous cooking device, according to one embodiment.

One high-level method 800 of operation is illustrated in the flow diagram of FIG. 8. The cooking device is trained by creating recipe files which contain processed sensory data captured during training for various phases of cooking a recipe (step 810). In one embodiment, the recipe files are uploaded to an online community for sharing. Training details are discussed further in reference to FIG. 9 below.

When ready to make a particular dish, an appropriate recipe file is selected and loaded into the cooking device (step 820). In an embodiment, the recipe file can be downloaded from the online community, for example, responsive to a database query. A user can be guided to load ingredients (step 830). Visual feedback, or audio instructions can be given to a user, and sensors can verify when ingredients are loaded, and make sure adequate amounts are supplied.

Finally, the cooking device automatically prepares the dish with loaded ingredients, according to phases of the recipe file (step 840). Sensors are used to monitor cooking and feedback a state such as how much cooking time remains or when a new phase of cooking should begin, as set forth in FIG. 10.

Figure 9:
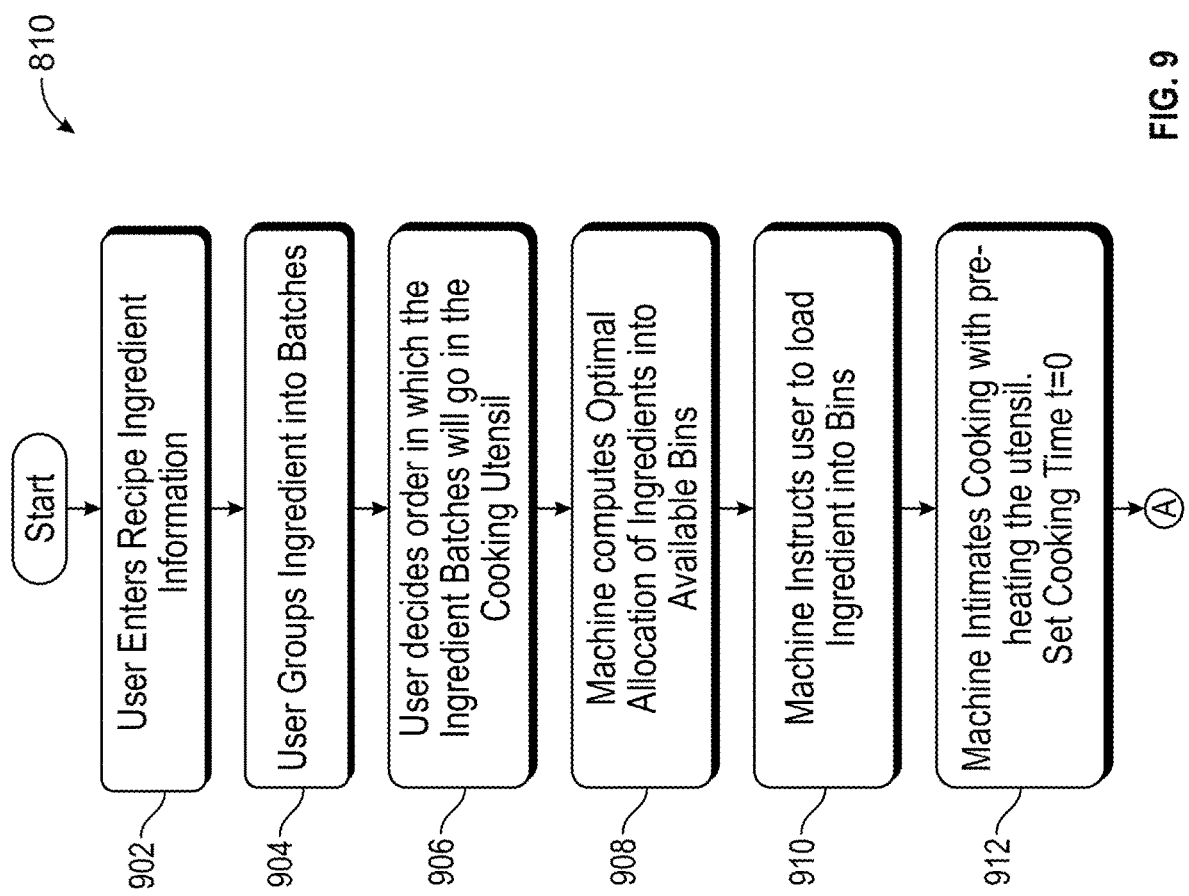
FIG. 9 is a flow diagram illustrating a step of training the autonomous cooking device in the method of claim 8, according to one embodiment.
Figure 9:
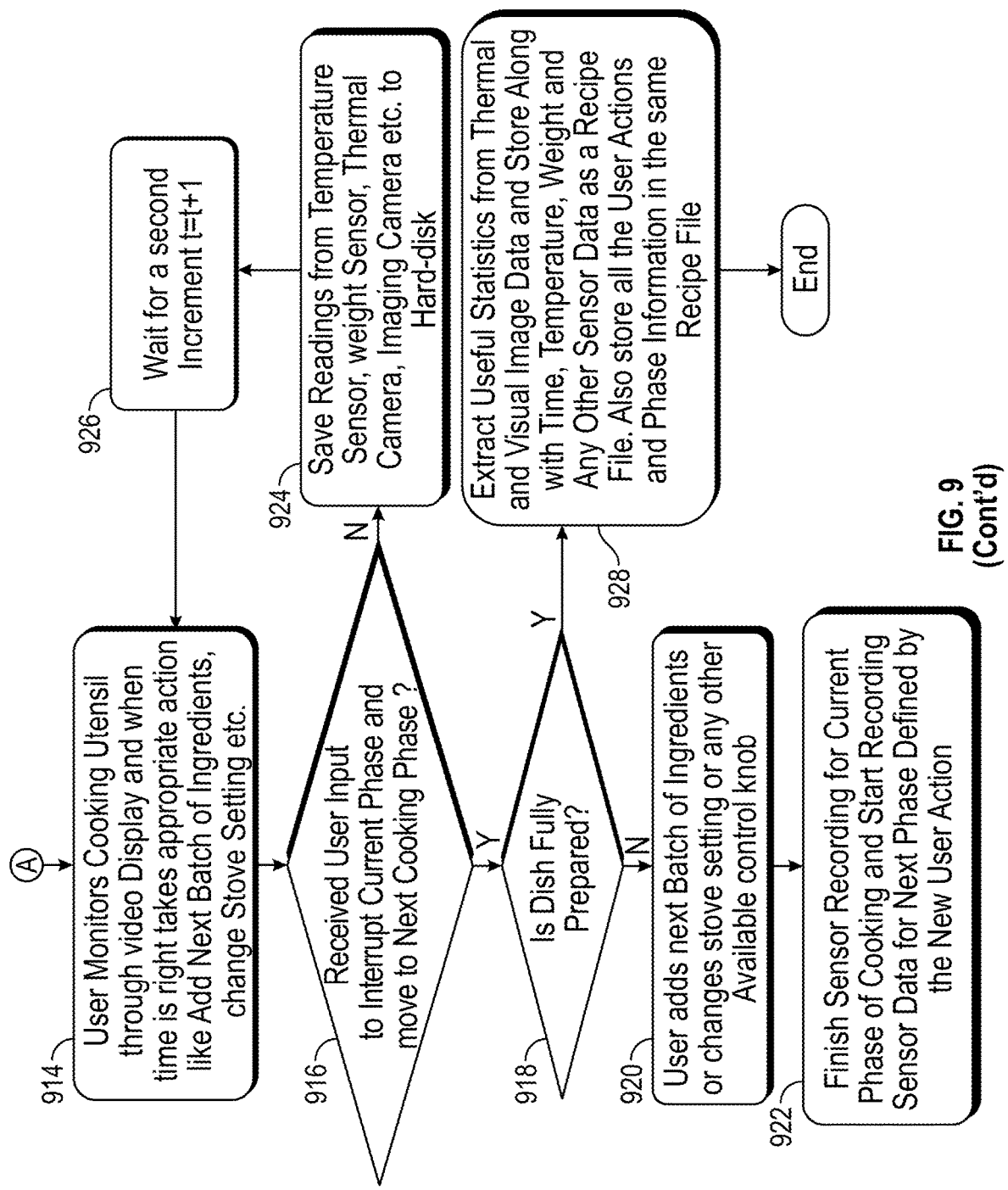

FIG. 9 shows one example of the training step 810 from FIG. 8. A user enters recipe ingredient information (step 902). The ingredients are grouped in to batches (step 904) and are ordered for loading into a cooking device (step 906). Feedback from the cooking device displays how to best allocate ingredients for loading into containers of an ingredient dispenser unit (steps 908 and 910). For some recipes, the cooking device starts with preheating a cooking unit (step 912).

The process of cooking a recipe can be divided into phases where a phase is a period of cooking with same set of ingredients and no change in set control knobs. For example, boil milk at 180 F while constantly stirring till user adds tea leaves is one phase of tea recipe. In another example, cooking onions at medium stove settings till they are caramelized is one phase. During training process, a phase is terminated by a user action like change in stove setting or adding the next batch of ingredients etc. End of current cooking phase automatically starts the next phase of cooking. During training process, as shown in FIG. 9, user controls the device by monitoring through a display and the cooking device continues storing sensor data from including temperature, weight and images (loop with step 914, 916, 924, 926) until the user determines that a phase is complete or that the dish is fully prepared (step 918). Before commencing the next phase, the user adds the next batch of ingredients and adjusts settings as needed (step 920). The cooking device continues recording sensor data for the phase (step 922). Once the phases are complete (step 918), the cooking device extracts useful statistics for time, temperature and weight for storage in the recipe file (step 928).

Figure 10:
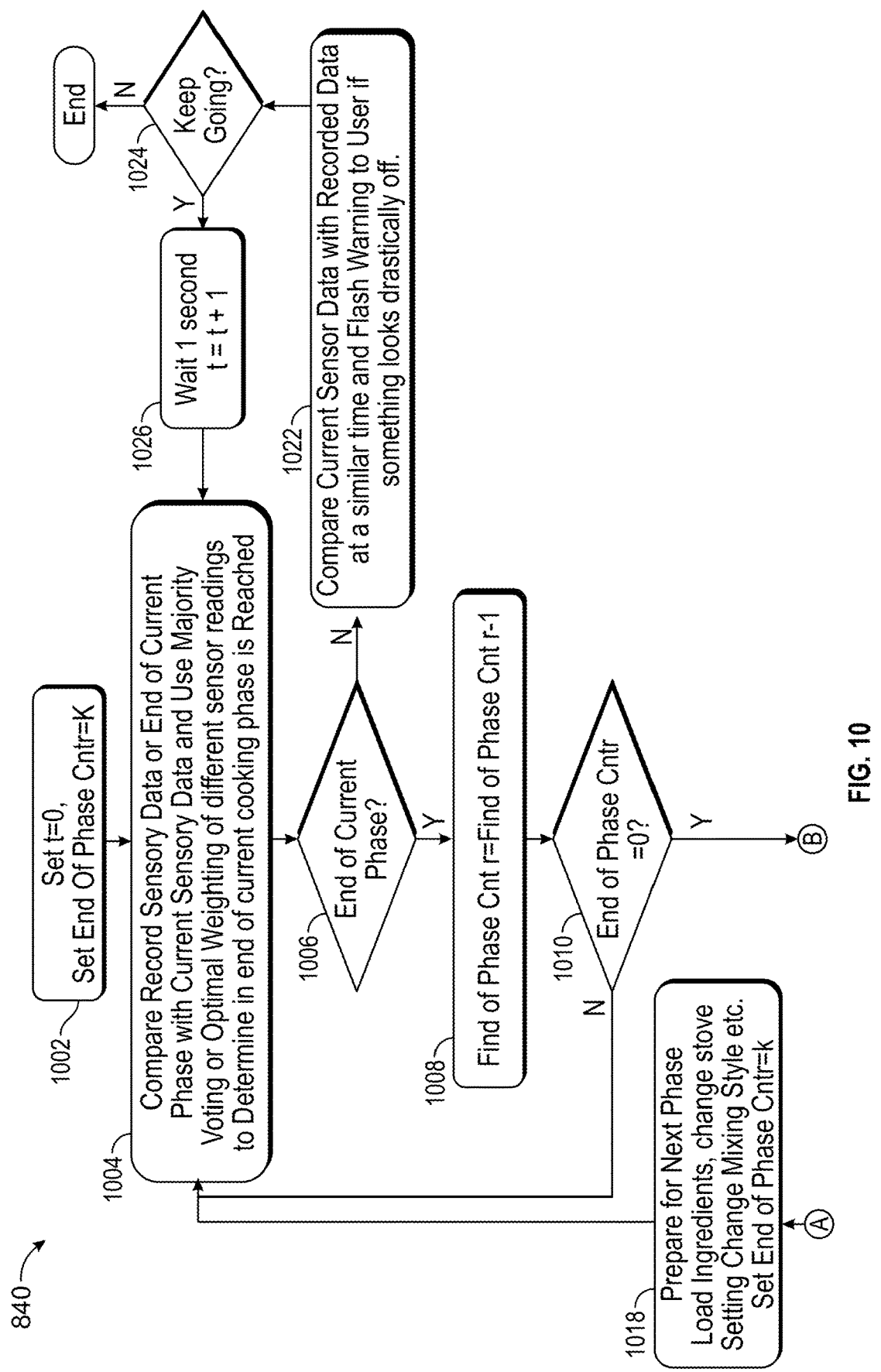
FIG. 10 is a flow diagram illustrating a step of automatically preparing dishes with the autonomous cooking device in the method of claim 8, according to one embodiment.
Figure 10:
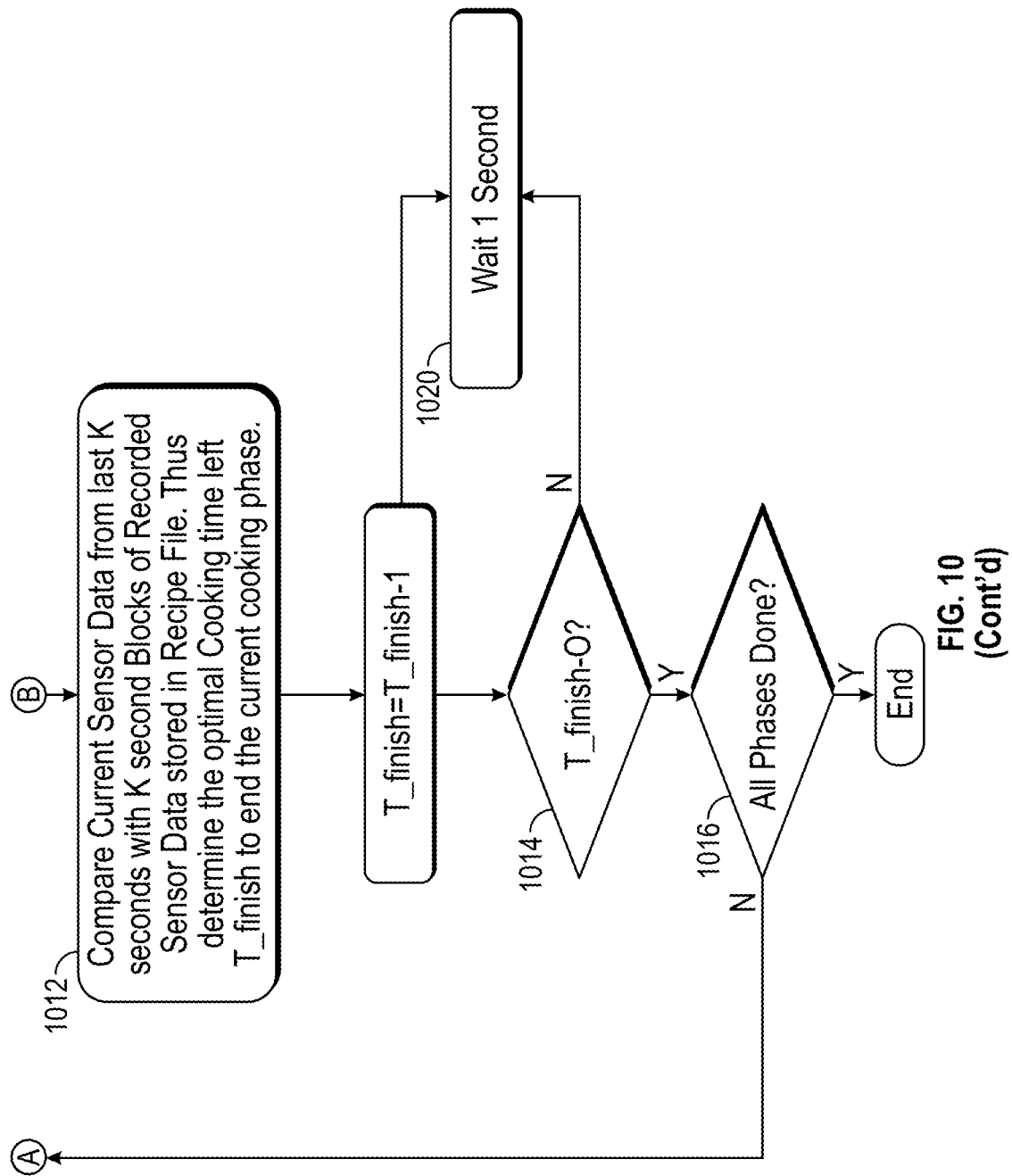

FIG. 10 shows one example of the automatic cooking step 840 from FIG. 8. A number of phases is set (step 1002). Sensory data from one or more sensors is compared with recorded sensory data from (step 1004) to determine when a phase has ended (step 1006). More specifically, cooking process in encapsulated into a recipe file by breaking up the process into phases. For example, tea preparation can be represented in five phases: phase 1 to pre-heat utensils for a fixed amount of time and adds water to the cooking utensil; phase 2 boils water and adds additional ingredients such as tea, cardamoms and ginger; phase 3 boils the ingredients for a certain amount of time and then adds milk; phase 4 continues boiling; and phase continues to cook at a lower heat. Different instructions from the recipe files can be executed within different phases, or specified for the beginning or end of a phase. Other instructions include mixing, opening or closing lids, stirring, and the like.

As such, one main task of the device during autonomous cooking mode is to replicate decision-making ability of an expert cook and decide when a particular phase is completed. This is accomplished in a two-step process. The first step is a coarse decision step (step 1002, 1004, 1006, 1008, 1024, 1022) where the current sensory data is compared with recorded sensory data at all time points of ongoing cooking phase. Coarse decision step ends when current sensory data is closest to the last time point of ongoing cooking phase at-least K times. To further improve the accuracy of cooking timing, a second fine decision step (1010, 1012, 1014, 1016) follows the coarse decision step. In fine decision step sensory data from last M time points is correlated with a moving window of M time points in recorded data to determine the optimal time T_finish to end the current cooking phase. Subsequently, ongoing cooking phase proceeds for a period of T_finish seconds before moving to next phase of cooking.

In one embodiment, cooking errors for a phase are recognized by analyzing sensor data (step 1024) and in some cases cooking may be ended (step 1022). For e.g., if the statistical distance between current image at start of a cooking phase and recorded image at start of the same phase is more than a pre-defined threshold, the ingredients are likely very different from recommended ingredients for the recipe and error is flagged to the user. In another example, if the weight of the ingredients in cooking unit is significantly off the weight in recorded recipe file, error is flagged to the user.

Figure 11:
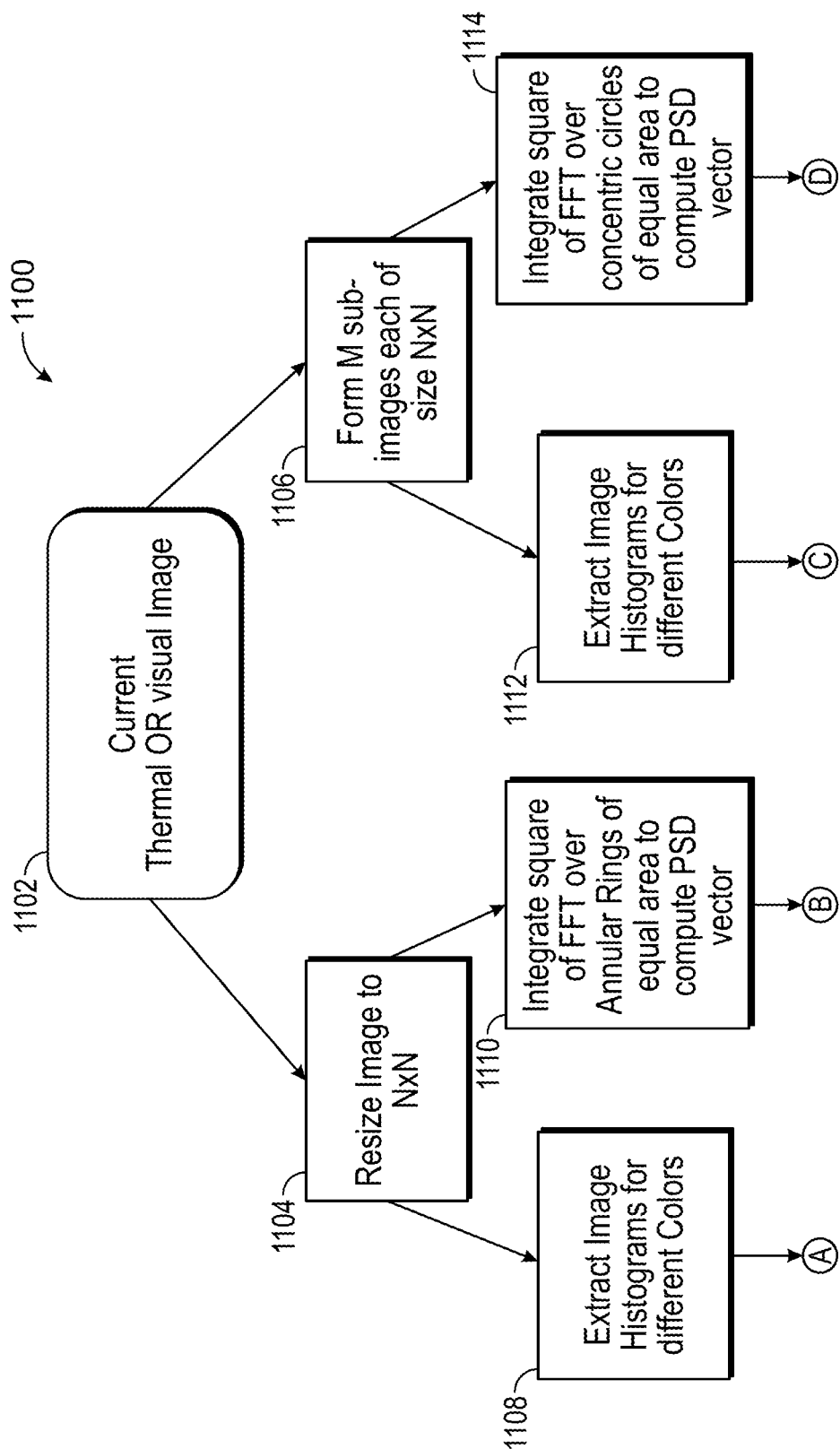
FIG. 11 is a flow diagram illustrating a step of computing a measure of closeness between two images, in determining an end of a cooking phase in the autonomous cooking device in the automatic preparation step of claim 9, according to one embodiment.
Figure 11:
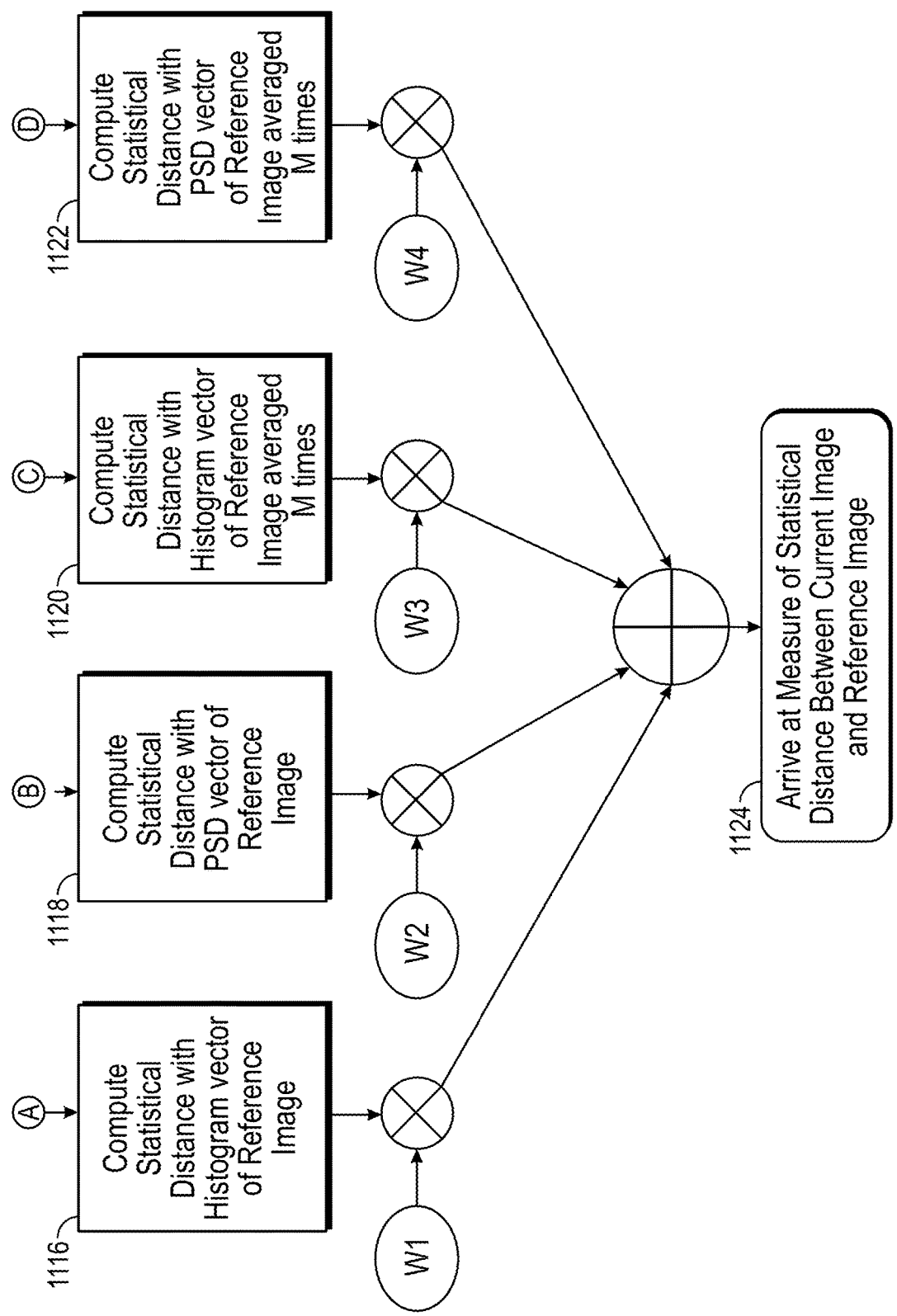

FIG. 11 shows one example of the sensory comparison step of FIG. 10, for images. A current thermal or visual is received (step 1102). The image is resized to N×N (step 1104) and formed into M sub-images of N×N size (step 1106). In other words, a 500×500 pixel image is reduced for processing efficiency and processed as a 100×100 image in step 1102. The 500×500 image is also broken into 25 sub-images of 100×100 in step 1104. As a result, the algorithm considers the overall image comparison as well as sub-image comparisons. In some embodiments, sub-images can be unequally weighted to reduce the influence of background colors and to increase the influence of the middle of a turkey, for example.

Next, the dual paths of image comparison (i.e., steps 1104 and 1106) each perform two separate analyses: a first analysis is based on colors through a color histogram; and a second analysis is a texture analysis that is devoid of color and instead relying on a PSD (power spectral density). The PSD comparison is directed towards a texture of the food. For example, frozen chicken has a texture that is distinct from thawed chicken, as well as from fully cooked chicken. Therefore, texture analysis can indicate the progress of a particular phase.

The first of dual path analyses (i.e., histogram analysis) is based on colors. In more detail, the images are extracted into image histograms for different colors (steps 1108, 1112) so that a statistical distance can be computed with a histogram vector of at least one reference image (steps 1116, 1120).

Figure 13:
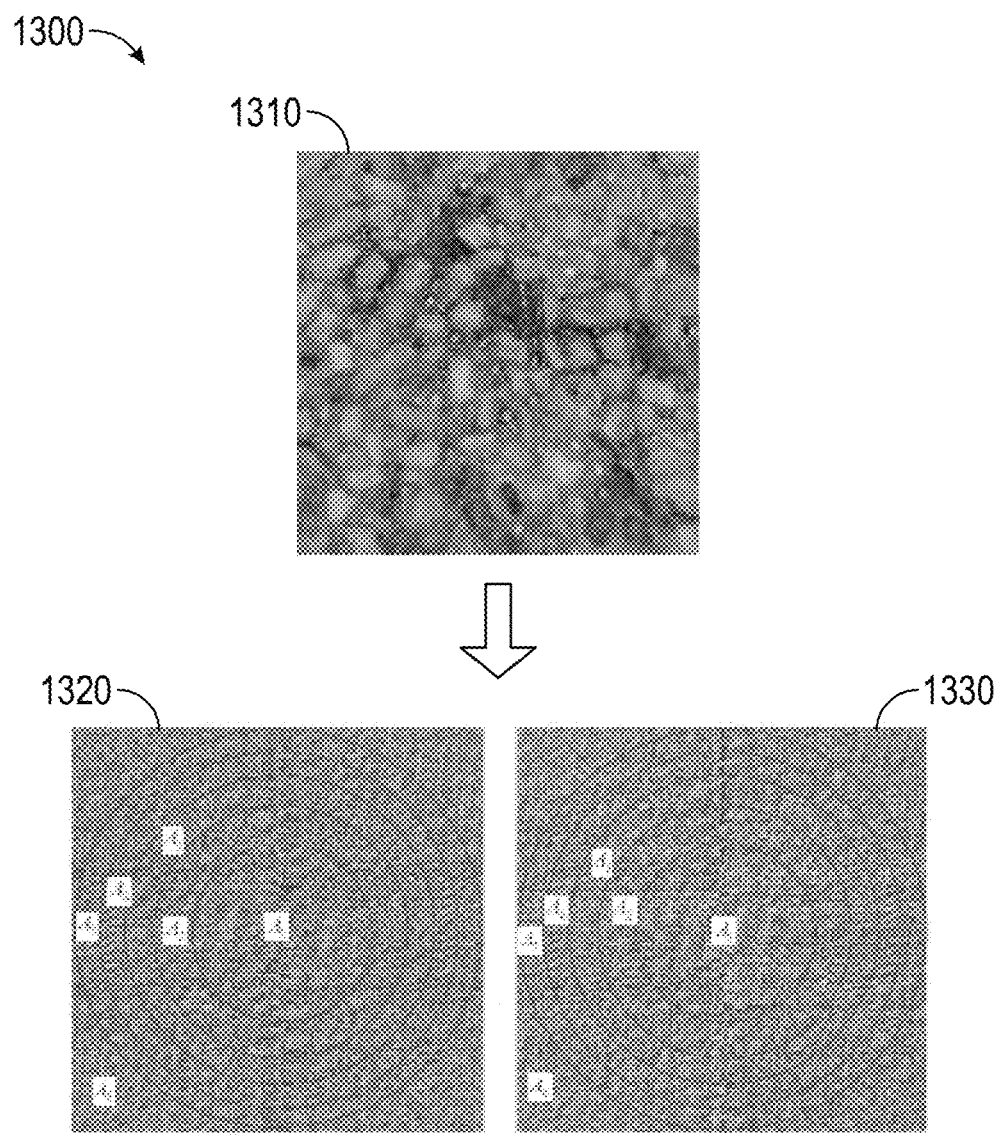
FIG. 13 is a diagram illustrating image processing for texture analysis steps 1110, 1114 of FIG. 11, according to one embodiment.

The second of dual path analyses (i.e., texture analysis) is preferably based on a black and white image rather than colors. As shown in FIG. 13, a black and white image 1310 showing texture of either food being prepared or of a reference food in preparation, is represented as:

$$I(r,c)$$

The square-shaped, black and white image 1310 is integrated over concentric circles of equal area 1320, 1330 to calculate a PSD (steps 1110, 1114) and are represented as:

$$Re\{I_{DFT}(u,v)\}$$

for 1320; and $$Im\{I_{DFT}(u,v)\}$$

for 1330

In turn, a statistical distance is computed with respect to a PSD vector of at least one reference image (steps 1118, 1122). As a result, a one-dimensional PSD is computed for a two-dimensional image. Each element of one-dimensional PSD is obtained by integrating a square of Discrete Fourier Transform of the two-dimensional image over annular rings of equal area starting from the center, using, for example, the following formula:

$$PSD_i = \sum_{(u,v) \in d_i} \langle (Re(I_{DFT}(u,v)))^2 + (Im\{I_{DFT}(u,v)\})^2 \rangle$$

This method of computing PSD allows comparison of texture for two images independent of orientation (e.g., a real-time image can be rotated 40 degrees within its frame and relative to a reference image). Other embodiments can have one, two, or more paths for analyses, using the histogram and texture analysis of the present example, or other types of image analysis.

In combination with weights W1, W2, W3 and W4, a statistical measure of the distance between the current image and the reference image is determined (step 1124) for determining a state of a phase or cooking process. The value of the weights can be fixed across all recipes, or it can be determined for a phase of recipe during post-processing of recipe data. For example, if for one cooking phase, the end of phase is better indicated with color histograms, then W1 and W3 can have higher weight than W2 and W4. Weightings can be adjusted per recipe file, per type of dish, be manually set, or be otherwise adjusted as appropriate. Thus, the two separate analyses for each of the dual paths of image comparison, can be individually weighted. Further, the resized image of step 1104 and the sub images of step 1106 can be weighted separately, between each other and between the dual paths of analysis.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

I claim:

1. An image processing unit, at least partially implemented in hardware, for improving comparison of images by determining combined image distance from dual path analyses, the image processing unit comprising:

an image sensor to capture one or more images of a subject for comparison against one or more reference images; and a control unit electrically coupled to the image sensor and to a storage device and comprising a processor and a memory device, the control unit comprising an image analyses module to compare one or more captured images against one or more reference images stored in the storage device, wherein the processor performs the comparison by determining a combined image distance between the one ore more captured images and the one or more reference images from a dual path analysis, the dual path analysis comprising a first image analysis based on histograms of image colors and a second image analysis based a one-dimensional power spectral density of a black and white instance of the one or more captured images and the one or more reference images, the one-dimensional power spectral density derived by integrating a Discrete Fourier Transform of a two-dimensional image over annular rings of substantially equal area starting from the center of the two-dimensional image, the image analysis module computes the combined image distance measure by combining an image distance measure generated from the color histograms data with an image distance measure generated from the one dimensional power spectral density comparison, and the image analysis module applies adjustable weights for each of the first and second paths, wherein the control unit takes an action to affect external to the image processing unit based on the combined image distance from the image comparison.

2. The image processing unit of claim 1, wherein the image processing unit takes the action, responsive to the combined image distance exceeding a threshold.

3. The image processing unit of claim 1, wherein the image analysis module compares a texture from the one or more captured images of food against a texture from the one or more reference images of food.

4. The image processing unit of claim 1, wherein the histograms of image colors comprise a red histogram, a green histogram, and a blue histogram.

5. A computer-implemented method in an image processing unit, at least partially implemented in hardware, for improving comparison of images by determining combined image distance from dual path analyses, the method comprising:

capturing one or more images of a subject;

comparing the one more captured images against one or more reference images with a control unit electrically coupled to the image sensor and to a storage device and comprising a processor and a memory device, wherein the step of comparing comprises:

determining a combined image distance between the one or more captured images and the one or more reference images from a dual path analysis, the dual path analysis comprising a first image analysis based on histograms of image colors and a second image analysis based a one-dimensional power spectral density of a black and white instance of the one or more captured images and the one or more reference images, the one-dimensional power spectral density derived by integrating a Discrete Fourier Transform of a two-dimensional image over annular rings of substantially equal area starting from the center of the two-dimensional image, computing the combined image distance measure by combining an image distance measure generated from the color histograms data with an image distance measure generated from the one-dimensional power spectral density comparison, and applying adjustable weights for each of the first and second paths; and taking an action to affect external to the image processing unit based on the combined image distance from the image comparison.

6. A computer-readable medium storing source code that, when executed by a processor, performs a computer-implemented method in an image processing unit, at least partially implemented in hardware, for improving comparison of images by determining combined image distance from dual path analyses, the method comprising:

capturing one or more images of a subject;

comparing the one more captured images against one or more reference images with a control unit electrically coupled to the image sensor and to a storage device and comprising the processor and a memory device, wherein the step of comparing comprises:

determining a combined image distance between the one or more captured images and the one or more reference images from a dual path analysis, the dual path analysis comprising a first image analysis based on histograms of image colors and a second image analysis based a one-dimensional power spectral density of a black and white instance of the one or more captured images and the one or more reference images, the one-dimensional power spectral density derived by integrating a Discrete Fourier Transform of a two-dimensional image over annular rings of substantially equal area starting from the center of the two-dimensional image, computing the combined image distance measure by combining an image distance measure generated from the color histograms data with an image distance measure generated from the one-dimensional power spectral density comparison, and applying adjustable weights for each of the first and second paths; and taking an action to affect external to the image processing unit based on the combined image distance from the image comparison.

\* \* \* \* \*